(12) United States Patent
Nichols, Sr.

(10) Patent No.: US 8,072,330 B1
(45) Date of Patent: Dec. 6, 2011

(54) HARD COVER PRODUCT WITH CONCEALED PRINTED SECURITY DEVICE

(75) Inventor: Dale Hunt Nichols, Sr., Nashville, TN (US)

(73) Assignee: Smartguard, LLC, Nashville, TN (US)

( * ) Notice: Subject to any disclaimer, the term of this patent is extended or adjusted under 35 U.S.C. 154(b) by 0 days.

(21) Appl. No.: 12/470,057

(22) Filed: May 21, 2009

Related U.S. Application Data

(63) Continuation-in-part of application No. 11/761,917, filed on Jun. 12, 2007, now Pat. No. 7,557,717, which is a continuation-in-part of application No. 11/593,314, filed on Nov. 6, 2006, now Pat. No. 7,605,703, which is a continuation of application No. 10/886,355, filed on Jul. 7, 2004, now Pat. No. 7,183,918.

(60) Provisional application No. 60/562,586, filed on Apr. 14, 2004.

(51) Int. Cl.
*G08B 13/14* (2006.01)

(52) U.S. Cl. ............... 340/572.1; 340/572.4; 340/572.8; 340/539.1; 340/693.5; 340/693.12; 340/825.72

(58) Field of Classification Search ............... 340/572.8, 340/572.1, 572.4, 539.1, 541, 693.5, 693.9, 340/693.12, 825.69, 825.72; 235/380, 382, 235/487, 492
See application file for complete search history.

(56) References Cited

U.S. PATENT DOCUMENTS

| | | |
|---|---|---|
| 3,938,831 A | 2/1976 | Herman |
| 4,709,813 A | 12/1987 | Wildt |
| 4,784,264 A | 11/1988 | Sykes |
| 4,881,061 A | 11/1989 | Chambers |
| 4,966,020 A | 10/1990 | Fotheringham et al. |
| 5,031,756 A | 7/1991 | Buzzard et al. |
| 5,209,086 A | 5/1993 | Bruhwiler |
| 5,236,081 A | 8/1993 | Fitzsimmons et al. |
| 5,260,690 A | 11/1993 | Mann |

(Continued)

FOREIGN PATENT DOCUMENTS

CN 2559492 Y 7/2003

(Continued)

OTHER PUBLICATIONS

"Method for Fitting RFID Tag to High-Grade Book", English translation of Abstract for JP2001-198565 (Takashi), Patent Abstracts of Japan, (Jan. 15, 2003).

(Continued)

*Primary Examiner* — Hung T. Nguyen
(74) *Attorney, Agent, or Firm* — Baker Donelson Bearman Caldwell & Berkowitz, PC

(57) ABSTRACT

A hard cover product with a pair of cover boards attached to an outer liner in spaced-relation to define a spine, with a thin-film ink-circuit security device printed on a laydown area, and having an inner liner. The laydown area can be defined in the spine, and the inner liner or an inner body attached to the cover boards conceals the printed security device from casual observation of its presence. The laydown area can be defined on a surface of a sheet laminated to another sheet to define one of cover boards. The laminated sheets sandwich the printed security device without a surface indication of the presence of the ink-circuit printed security device therein. In another aspect, the thin-film ink-circuit security device printed on a surface of the cover board is concealingly covered by the inner or the outer liner.

30 Claims, 12 Drawing Sheets

U.S. PATENT DOCUMENTS

| | | | |
|---|---|---|---|
| 5,276,435 | A | 1/1994 | Rossides |
| 5,297,672 | A | 3/1994 | MacTavish |
| 5,331,313 | A | 7/1994 | Koning |
| 5,440,296 | A | 8/1995 | Nelson |
| 5,477,219 | A | 12/1995 | Zarembo |
| 5,500,640 | A | 3/1996 | Zhou |
| 5,598,728 | A | 2/1997 | Lax |
| 5,620,271 | A | 4/1997 | Bergh |
| 5,656,998 | A | 8/1997 | Fujiuchi et al. |
| 5,680,782 | A | 10/1997 | Komatsu et al. |
| 5,718,332 | A | 2/1998 | Tachibana |
| 5,745,036 | A | 4/1998 | Clare |
| 5,749,735 | A | 5/1998 | Redford |
| 5,762,377 | A | 6/1998 | Chamberlain |
| 5,782,350 | A | 7/1998 | Weisburn et al. |
| 5,802,890 | A | 9/1998 | Espada-Velasco |
| 5,812,065 | A | 9/1998 | Schrott et al. |
| 5,823,341 | A | 10/1998 | Nakasuji |
| 5,847,649 | A | 12/1998 | Collins |
| 5,850,752 | A | 12/1998 | Lax |
| 5,882,052 | A | 3/1999 | Whitehead |
| 5,910,770 | A | 6/1999 | Ohara |
| 5,984,388 | A | 11/1999 | Bacon |
| 5,988,376 | A | 11/1999 | Lax |
| 6,082,156 | A | 7/2000 | Bin |
| 6,094,137 | A | 7/2000 | Rasch |
| 6,100,804 | A | 8/2000 | Brady |
| 6,142,697 | A | 11/2000 | Williams |
| 6,155,087 | A | 12/2000 | Necchi |
| 6,222,453 | B1 | 4/2001 | Joyce |
| 6,244,462 | B1 | 6/2001 | Ehrensvard et al. |
| 6,276,523 | B2 | 8/2001 | Sanders |
| 6,374,648 | B1 | 4/2002 | Mitsuyama |
| 6,497,125 | B1 | 12/2002 | Necchi |
| 6,601,415 | B2 | 8/2003 | Takinami |
| 6,614,750 | B2 | 9/2003 | Weber et al. |
| 6,616,035 | B2 | 9/2003 | Ehrensvard et al. |
| 6,619,079 | B2 | 9/2003 | Cheung |
| 6,628,199 | B1 | 9/2003 | Ehrensvard et al. |
| 6,888,509 | B2 | 5/2005 | Atherton |
| 6,937,153 | B2 | 8/2005 | Redlin |
| 6,947,371 | B2 | 9/2005 | Bigley |
| 7,008,134 | B2 | 3/2006 | Lane |
| 7,059,535 | B2 * | 6/2006 | Rietzler ........................ 235/492 |
| 2002/0134119 | A1 | 9/2002 | Derman |
| 2002/0149479 | A1 | 10/2002 | Duschek et al. |
| 2002/0196126 | A1 | 12/2002 | Eisenberg |
| 2003/0019770 | A1 | 1/2003 | Hodes |
| 2003/0094021 | A1 | 5/2003 | Takinami |
| 2003/0131638 | A1 | 7/2003 | Chang |
| 2003/0145635 | A1 | 8/2003 | Sheslow |
| 2003/0168514 | A1 | 9/2003 | Rancien |
| 2003/0234190 | A1 | 12/2003 | Kuo |
| 2004/0008613 | A1 | 1/2004 | Beckwith et al. |
| 2004/0066029 | A1 | 4/2004 | Parker |
| 2006/0116899 | A1 * | 6/2006 | Lax et al. ........................... 705/1 |

FOREIGN PATENT DOCUMENTS

| | | | |
|---|---|---|---|
| DE | 3212039 | A1 | 10/1983 |
| DE | 4226237 | A1 | 2/1994 |
| FR | 2746191 | A1 | 9/1997 |
| JP | 5191454 | | 7/1993 |
| JP | 2001198565 | | 1/2003 |
| JP | 2001328257 | | 5/2003 |
| WO | 9315294 | A1 | 8/1993 |
| WO | 9524703 | A1 | 9/1995 |

OTHER PUBLICATIONS

"RFID Label Printer", English translation of Abstract for JP2001-328257 (Shinsuke), Patent Abstracts of Japan, (May 9, 2003).

"Data Transfer System", English translation of Abstract for JP51-91454 (Takeshi), Patent Abstracts of Japan, (Jul. 30, 2003).

"About SenTech"; web page article from http://www.sentecheas.com/about.htm; www.cypak.com, Sen Tech EAS Corporation, 2843 Centerport Circle, Pompano Beach, FL 33064 (prior to Apr. 14, 2004).

"The Henderson Network"; web page article from http://www.cypak.com/index.php?a=pressroom&b=newscomdex021121;Aug. 18, 2004; www.cypak.com, Cypak AB, Funckens Gränd 1, Box 2332, 103 18 Stockholm, Sweden.

"Intelligent Pharmaceutical Packaging"; "Summary" and IPP PowerPoint™ presentation from http://www.cypak.com/index.php?a=products&b=ipp&c=summary&page=products_ipp; www.cypak.com, Cypak AB, Funckens Gränd 1, Box 2332, 1103 18 Stockholm, Sweden (prior to Apr. 14, 2004).

"Intelligent Pharmaceutical Packaging"; "Articles"; web page articale from http://www.cypak.com/index.php?a=pressroom&b=articles&page=pressroom_articles; www.cypack.com, Cypak AB, Funckens Gränd 1, Box 2332, 103 18 Stockholm, Sweden (prior to Apr. 14, 2004).

"The Connected Drug Box"; web page article from http:..web.archive.org/web/20021209044120/cypak.com/index.php?a=pressroom&b=news&page=...; www.cypak.com, Cypak AB, Funckens Gränd 1, Box 2332, 103 18 Stockholm, Sweden (prior to Dec. 9, 2002).

"Roland Piquepaille's Technology Trends"; "Cypak Mounts CPUs on Paper. Can Disposable PC's be far off?"; web page article from http://radio.weblogs.com/0105910/2003/02/03.html; Jan. 3, 2004.

RFID Journal "The Package Is the Computer"; web page article from http://www.rfidjournal.com/article/view/301; Feb. 11, 2003.

"Electronic Compliance Packaging"; web page article from http://web.archive.org/web/20030409195629/www.cypak.com/index.php?a=products&b=packaging&page=products_packaging; www.cypak.com, Cypak AB, Funckens Gränd 1, Box 2332, 103 18 Stockholm, Sweden (prior to Apr. 9, 2003).

"We are innovators . . . "; web page article from http://web.archive.org/web/20031206192144/http://cypak.com; www.cypak.com, Cypak AB, Funckens Gränd 1, Box 2332, 103 18 Stockholm, Sweden (prior to Dec. 6, 2003).

"Jan. 13, 2004 Cypak signs agreement to license proprietary intelligent pharmaceutical packaging technology to MeadWestvaco Healthcare Packaging;" web page article from http://.cypak.com?test_site/index.php?a=pressroom&b=news&page=news_meadwestvaco04...; Jan. 13, 2004; www.cypak.com, Cypak, AB, Funkens Gränd 1, Box 2332, 103 18 Stockholm, Sweden.

MeadWestvaco, Healthcare Packaging, announcement, New York, NY Apr. 2, 2004, "MeadWestvaco Healthcare Packaging enhance electronic compliance packaging offering using Cypak AB Products".

Smart Healthcare USA 2004, "RFID and Smart Packaging in healthcare"; web page article from http://www.idtechex.com/smarthealthcareusa/4.asp; Jun. 10-11, 2004.

"The Swedish Industrial Development Fund and IT Provider invest in Cypak"; web page article from http://64.233.179.104/search?q=cache:rKf2CZYzvloJ:cypak.vnewscenter.com/press.jsp%3Fid%3...; Aug. 18, 2004, www.cypak.com, Cypak AB, Funckens Gränd 1, Box 2332, 103 18 Stockholm, Sweden.

Conference Report: "Smarter Packaging", Packworld.com Packaging World Magazine; web page article from http://www.packworld.com/articles/Features/18411html, Nov. 2004.

KR 535 Tabmaster Product Flyer, "The KR 535 makes tabbing of paper products faster and easier than ever. Here's why . . . ", Kirk Rudy, Inc., 2700 Kennesaw Due West Road, Kennesaw, GA., USA 30144 (prior to Apr. 14, 2004).

KR 203P Attaching System Product Flyer, "The KR 203P attaches a wide variety of cards and pre-packaged samples onto various mailers and inserts", Kirk Rudy, Inc., 2700 Kennesaw Due West Road, Kennesaw, GA., USA 30144 (prior to Apr. 14, 2004).

The ENDPAPER, "RFID Tags and the ALA", p. 9, Library Binding Institute, 14 Bay Tree Lane, Tequesta, FL 33469 (May 2005).

MSN Search "acousticmagnetic" listing Sentech Acousto-Magnetic (AM) Tags, www.sentecheas.com (search conducted Aug. 12, 2004).

Sentech EAS Corporation, www.sentecheas.com, Product Listing (2 p), RF Technology (1 p), and About Sentech (1p), (prior to Apr. 14, 2004).

International Search Report, PCT/US05/13105 (Jan. 31, 2007).

\* cited by examiner

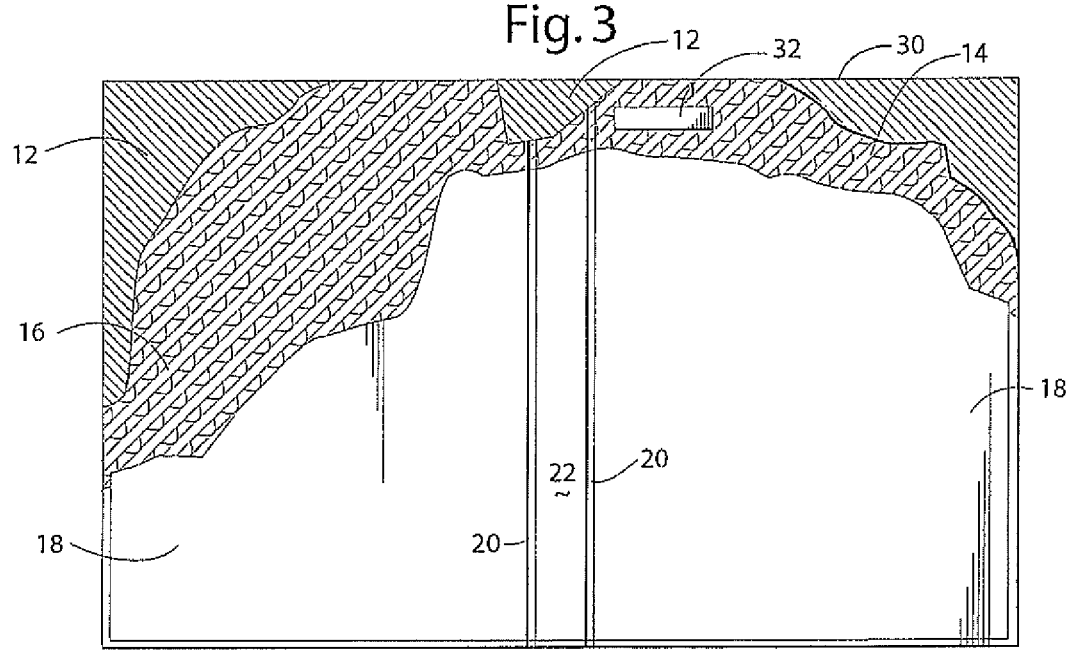
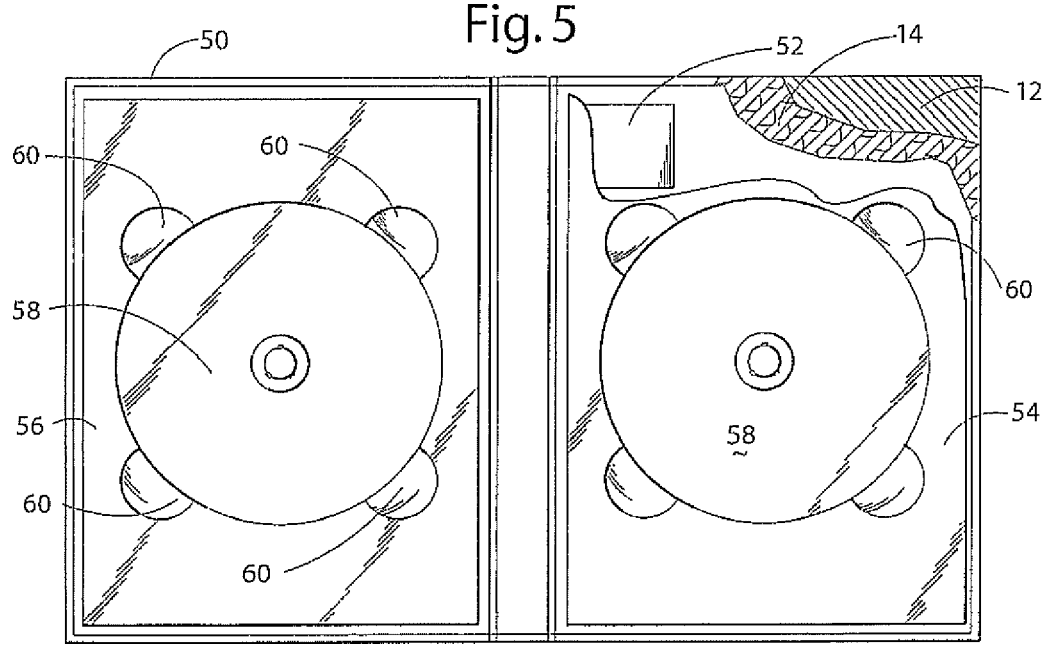

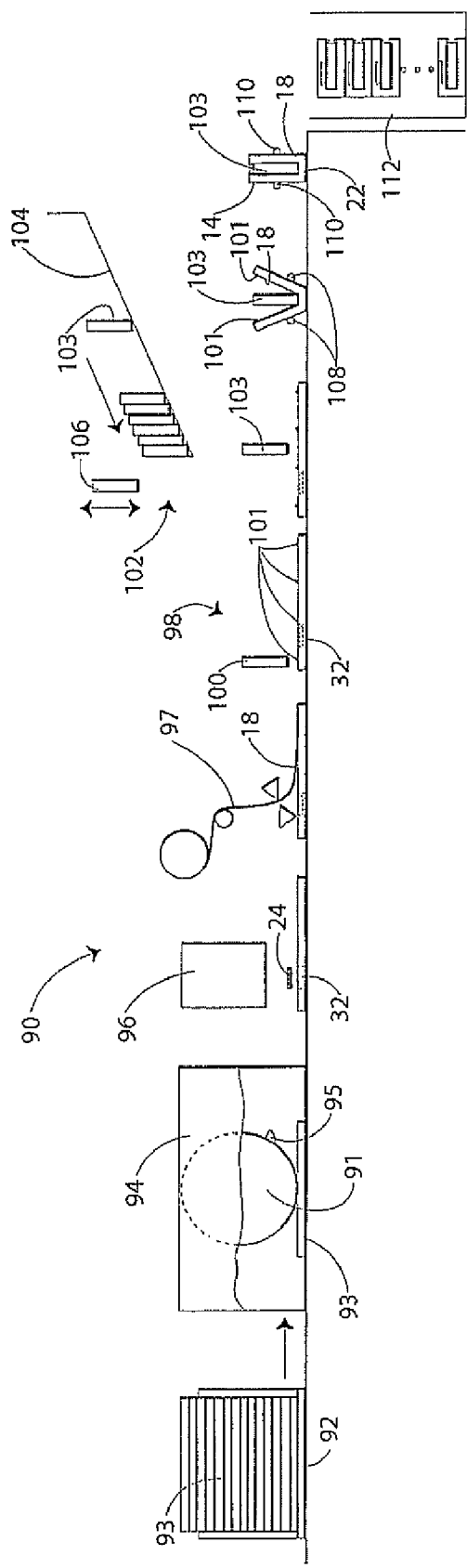

HARD COVER PRODUCT WITH CONCEALED PRINTED SECURITY DEVICE

The present application is a continuation-in-part of nonprovisonal patent application Ser. No. 11/761,917, filed Jun. 12, 2007, U.S. Pat. No. 7,557,717, which is a continuation-in-part of nonprovisional patent application Ser. No. 11/593,314, filed Nov. 6, 2006, U.S. Pat. No. 7,605,703, which is a continuation of nonprovisional patent application Ser. No. 10/886,355, filed Jul. 7, 2004, U.S. Pat. No. 7,183,918, which claims priority to provisional patent application Ser. No. 60/562,586, filed Apr. 14, 2004, all of which are incorporated herein by reference.

TECHNICAL FIELD

The present invention relates to hard cover products. More particularly, the present invention relates to a hard cover product with a concealed security device for facilitating manufacture and use of hard cover products.

BACKGROUND OF THE INVENTION

In recent years, tracking of inventory of goods has become of increased importance. Inventory of goods represents a significant investment in capital. In addition to cost factors, other aspects prompting increased interest in tracking inventory include the increase in just-in-time manufacturing in which materials are provided by suppliers shortly prior to the time of use by the manufacturer of goods, as well as theft deterrence and inventory verification and auditing.

Various electronic and mechanical devices have been provided for tracking and monitoring of goods and containers. These devices include acoustic magnetic security strips and radio frequency security tags. These devices often are embodied in tags, pods, labels, or patches, having adhesive surfaces for attaching the device to the goods or their containers. These devices facilitate tracking and monitoring of goods and containers. The security devices are typically attached to the articles particularly susceptible to pilferage and improper removal from a warehouse or retail store. The security devices include a detectable sensor. One known type of security tag has a circuit that resonates at a predetermined detection frequency range. A transmitter provides electromagnetic energy that excites the circuit. A receiver detects the output signal from the resonating circuit. The transmitter and the receiver are located at detection points, often exits from retail facilities. As the article is carried through the detection point, the receiver signals an alert when an activated sensor device is detected. For articles that are permitted to pass (such as purchased articles), a separate device is used to deactivate the detectable sensor prior to passage. Other devices include RFID devices that communicate digital signals. In some known RFID devices, the signal is indicative of unique identifiers for tracking particular containers. Moreover, thin-film RFID devices have recently been developed that provide very thin device configurations.

Often large retailers require manufacturers of articles to include tracking and monitoring devices within the containers for the articles. For smaller retailers and smaller inventories of articles, the tracking and monitoring devices may not be included with or attached to containers. In such circumstances, the articles may be provided with after-market tracking and monitoring devices. For example, electronic article surveillance tags are available with adhesive backing to secure the tags to the containers. While the containers are thereby subject to electronic article surveillance, the adhesively attached tags experience problems during use. One significant problem is that the tags, being on the exterior of the container, are susceptible to removal. Removing the security tag facilitates unauthorized removal of the article from the secured area. However, removal by a purchaser also causes problems. The covering to which the security tag attaches may become torn or ripped. The package with the security tag, or without such by removal, is unattractive. The security tag may also overlie or cover over ornamental graphics or text on the packaging.

Also, importantly, the attachment of an electronic security tag to an interim assembly of an article during manufacture lead to production and handling problems. The security tag projects from the surface to which it attaches. This causes stacked ones of the interim assemblies to gradually angle or tip as the stack height increases with placement of additional interim assemblies. For example, hard cover books assembled using casing machines receive an outer liner that attaches to front cover stock and back cover stock. Such interim assemblies are stacked for a second pass through the casing machine to apply an inner liner. Angled stacks make production and handling more difficult during manufacturing. Further, the protruding security tag may scratch the adjacent assembly, for example, when a feeder device pushes one of the assemblies from a hopper for processing and applying the inner liner.

Accordingly there is a need in the art for providing hard cover products with concealed security tracking and monitoring devices. It is to such that the present invention is directed.

SUMMARY OF THE INVENTION

The present invention meets the need in the art by providing a hard cover product, comprising an outer liner and a pair of rigid cover boards pre-cut to a selected size and disposed in spaced-apart relation to define a spine gap for a hard cover product while defining opposing front cover and back cover therefor and each attached on a respective major surface to a major surface of the outer liner. At least one of the rigid cover boards comprises a pair of opposing sheets having opposing planar surfaces with a length and width exceeding a thickness, a first one of the pair of opposing sheets defining in a selected portion a laydown area on the planar surface thereof and a thin-film ink-circuit security device printed on the laydown area, the printed thin-film ink-circuit security device having a thickness no greater than about a minority of the thickness of the sheet. The pair of opposing sheets laminated together to sandwich the printed thin-film ink-circuit security device concealingly there between, with the opposing sides of the one of the rigid cover boards substantially parallel without a surface indication of the presence of the printed thin-film security device therein, whereby the printed thin-film ink-circuit security device enclosed and laminated in said one of the rigid cover boards is concealed from casual indication of its presence and is held after lamination safely and securely therein during manufacture of the hard cover product and during normal use thereof for hard cover product purposes. An inner liner attached in overlying relation to the opposing planar surfaces of the rigid cover boards and an interior body cooperatively supported within the hard cover product. The opposing rigid cover boards define a front cover and back cover that move together foldably along lines defined by opposing sides of the spine for containing the interior body within the hard cover product.

In another aspect, the present invention provides a hard cover product, comprising an outer liner and a pair of cover boards pre-cut to a selected size and disposed in spaced-apart relation to define a spine gap for a hard cover product while defining opposing front cover and back cover therefor and each attached on a first respective major surface to a major surface of the outer liner. At least one of the cover boards comprising a sheet having opposing planar surfaces with a length and width exceeding a thickness, a first one of the opposing planar surfaces defining in a selected portion a laydown area thereof; and a thin-film ink-circuit security device printed on the laydown area, the printed thin-film ink-circuit security device having a thickness no greater than about a minority of the thickness of the sheet. An inner liner attached in overlying relation to the respective second major surfaces of the cover boards, the inner liner and the one of the cover boards laminated together to sandwich the printed thin-film ink-circuit security device concealingly there between, whereby the printed thin-film ink-circuit security device enclosed therein is concealed from casual indication of its presence and is held after lamination safely and securely therein during manufacture of the hard cover product and during normal use thereof for hard cover product purposes. An interior body cooperatively supported within the hard cover product, with the opposing cover boards defining a front cover and back cover that move together foldably along lines defined by opposing sides of the spine for supporting and enclosing the interior body within the hard cover product.

In another aspect, the present invention provides a hard cover product, comprising an outer liner and a pair of cover boards pre-cut to a selected size and disposed in spaced-apart relation to define a gap that receives a spine for a hard cover product while defining opposing front cover and back cover therefor and each attached on a respective first major surface to a major surface of the outer liner. The cover boards each comprising a sheet having opposing planar surfaces with a length and width exceeding a thickness. The spine defining in a selected portion a laydown area with a thin-film ink-circuit security device printed on the laydown area, the printed thin-film ink-circuit security device having a thickness no greater than about a minority of the thickness of the chipboard cover boards. An inner liner attached in overlying relation to the respective second major surfaces of the cover boards, the inner liner and the cover boards laminate together. An interior body cooperatively supported within the hard cover product with opposing sides attached to the inner liner and a back attached to the spine for concealing the printed thin-film ink-circuit security device from casual indication of its presence and held after attachment safely and securely therein during manufacture of the hard cover product and during normal use thereof for hard cover product purposes. The opposing cover boards define a front cover and back cover that move together foldably along lines defined by opposing sides of the spine for supporting and enclosing the interior body within the hard cover product.

In another aspect, the present invention provides a hard cover product, comprising an outer liner and a pair of cover boards pre-cut to a selected size and disposed in spaced-apart relation to define a gap that receives a spine for a hard cover product while defining opposing front cover and back cover therefor and each attached on a respective first major surface to a major surface of the outer liner. The cover boards each comprising a sheet having opposing planar surfaces with a length and width exceeding a thickness. The spine defining in a selected portion a laydown area with a thin-film ink-circuit security device printed on the laydown area, the printed thin-film ink-circuit security device having a thickness no greater than about a minority of the thickness of the cover boards. An inner liner attached in overlying relation to the respective second major surfaces of the chipboard cover boards and overlapping the spine, the inner liner and the cover boards laminated together for concealing the printed thin-film ink-circuit security device from casual indication of its presence and held after attachment safely and securely therein during manufacture of the hard cover product and during normal use thereof for hard cover product purposes. An interior body cooperatively supported within the hard cover product. The opposing cover boards define a front cover and back cover that move together foldably along lines defined by opposing sides of the spine for supporting and enclosing the interior body within the hard cover product.

Objects, advantages and features of the present invention will become apparent from reading of the following detailed description of the invention and claims in view of the appended drawings.

BRIEF DESCRIPTION OF THE DRAWINGS

FIG. 3 is a plan view of an embodiment of the present invention providing a hard cover product with a concealed security device.

FIG. 4 is an exploded edge view of the hard cover product assembly illustrated in FIG. 3.

FIG. 5 is a plan view of an alternate embodiment of the hard cover product according to the present invention.

FIG. 9 is a schematic illustration of an assembly line for manufacturing hard cover products of the present invention.

DETAILED DESCRIPTION

Figure 1:
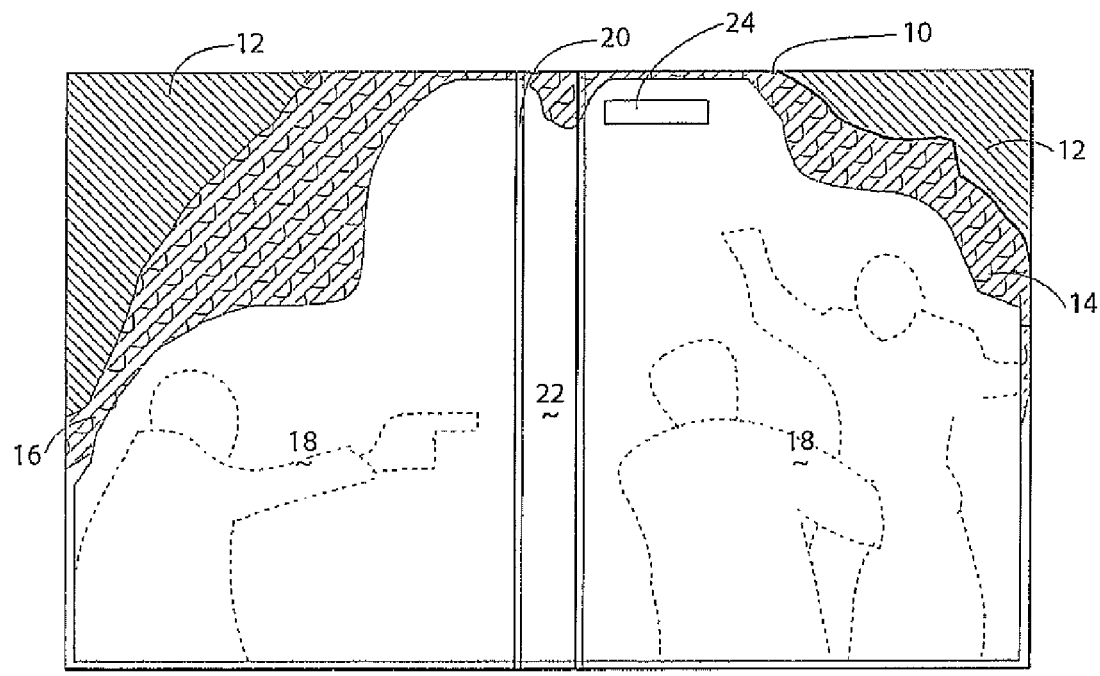
FIG. 1 is a plan view of a hard cover product in which a security device is attached to an exterior surface.
Figure 2:
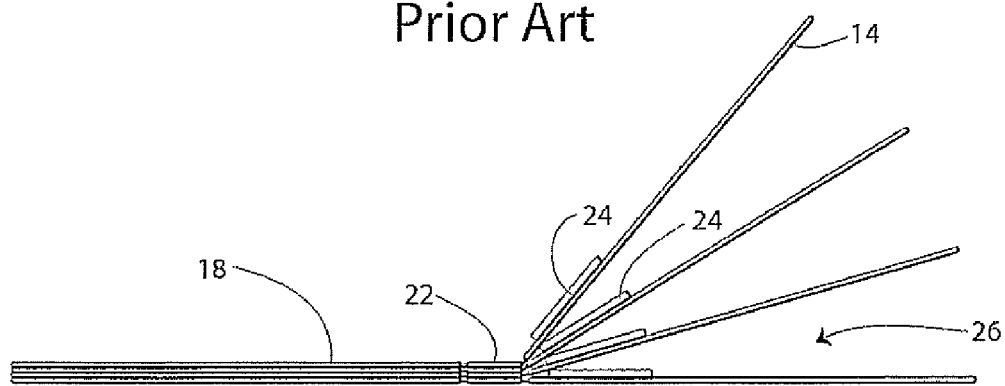
FIG. 2 is an end view of a stack of assemblies used to make a hard cover product illustrated in FIG. 1.

Referring now in more detail to the drawings in which like numerals refer to like parts throughout the several views, FIG. 1 illustrates a hard cover product 10 having an outer liner 12, a pair of spaced-apart sheets 14, 16, and covered by an inner liner 18. The enclosed sheets 14, 16 define front and back covers for the product. A pair of spaced-apart grooves or scores 20 enable the sheets 14, 16 to fold together to close the hard cover product 10. A gap 22 between the scores 20 defines a spine or back of the closeable hard cover product 10. A security sensor 24 attaches with adhesive to the face of the inner liner 18 in a selected position. The sensor extends above the surface defined by the inner liner 18. As illustrated in FIG. 2, this can lead to handling and production problems during manufacture of the hard cover product 10. The upwardly extending security sensor causes a portion of the stack to be disposed an oblique angle 26, rather than lying flat. This uneven stack makes handling of work in progress more difficult.

FIG. 3 illustrates a hard cover product 30 according to the present invention in which the security sensor 24 is concealed within an assembly of the outer liner 12, the sheets 14, 16, and the inner liner 18. FIG. 4 is an exploded edge view of the hard cover product assembly illustrated in FIG. 3. A recess 32 is formed in the sheet 14 such as by die cutting the sheet in a casing operation typical for binding of books using a casing machine. An applicator apparatus places the security sensor 24 within the recess 32. The outer liner 12 closes the recess 32 from an exterior side of the assembly for the hard cover product 30, and the inner liner 18 closes the recess 32 from the opposing interior side. The inner liner 18 thereby conceals the security device 24 within the hard cover product 30.

The thickness of the sheet 14 (on a line 34 shown in FIG. 4 transverse through the opposing major surfaces) is preferably sufficient that the security device 24 is recessed in the recess 32 relative to the major surfaces. The sheets 14, 16 are cardboard sheet, fiberboard sheets, or other stiff or hard sheet material suitable for forming a cover to a book, casing, or other article-container.

In the illustrated embodiment, the gap 22 defines scores or grooves in the overlapped inner and outer lines 12, 18. These define pivots or lines on which the front and back covers fold together.

FIG. 5 illustrates an alternate embodiment of a hard cover product 50 according to the present invention. In this embodiment, a substantially planner radio frequency tag 52 attaches to the surface of the sheet 14a. The inner liner 18 attaches in overlaying relation to the sheets 14, 16. In the illustrated embodiment, which does not include the recess 32, the inner liner 18 extends over the area of the spine. The inner liner 18 thereby overlies and concealingly encloses the sheet-like security tag 52. The security tag 52 is perceptible as a slight bulge, but generally does not detract from the graphics or text on the inner liner.

Figure 8A:
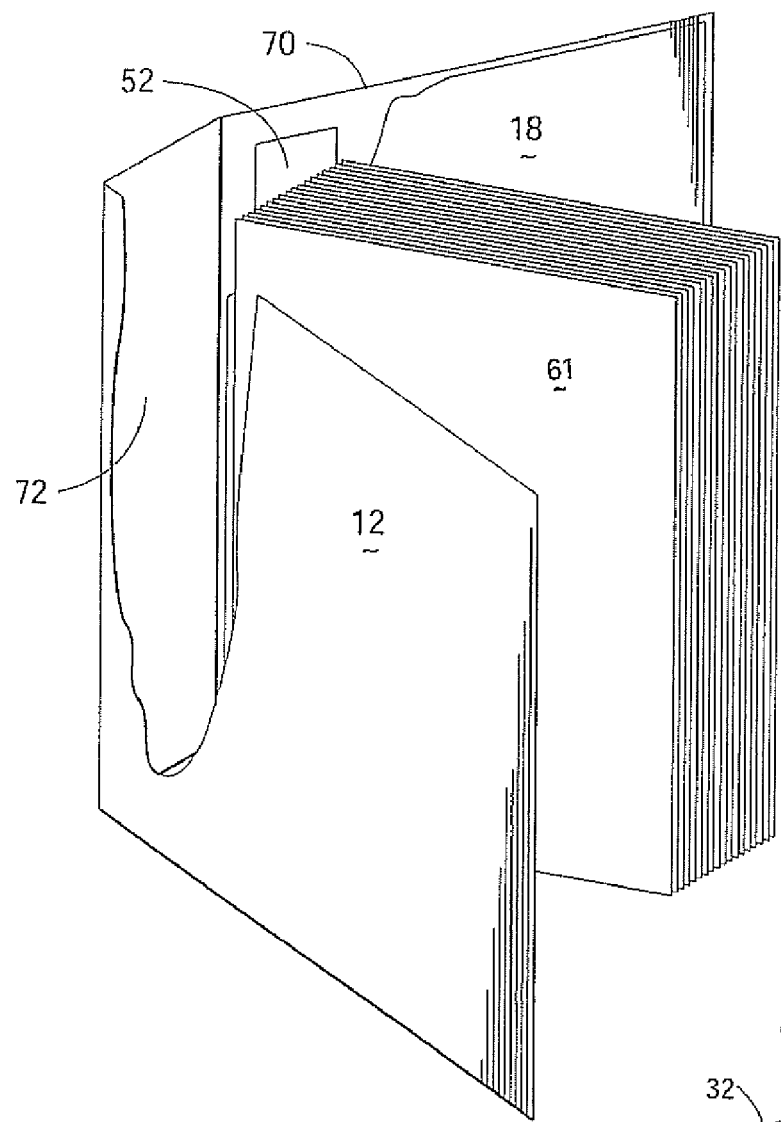
FIGS. 8A and 8B are perspective views of a hard cover product with a bound assembly of papers for a book.
Figure 8B:
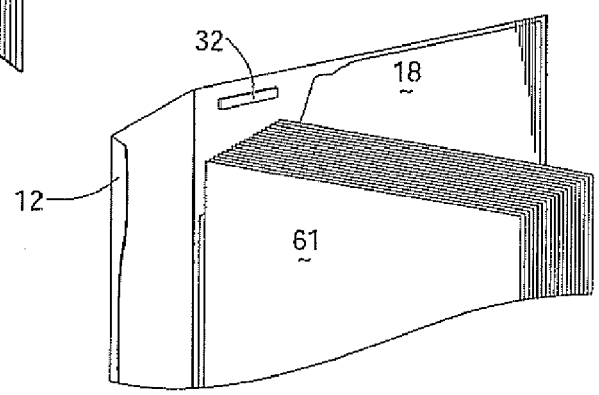

In the illustrated embodiment, the hard cover product 50 attaches to an interior body, such as plastic matingly engagable plastic diskholders, configured for receiving compact discs or DVD discs. However, the interior body may be a bound assembly of papers for a book. Other shell devices that define an interior body for the hard cover product may be gainfully attached to the interior front and back covers, such as for packaging small articles, video tapes, books, ring binders, or other articles. For example, FIGS. 8A and 8b illustrate a bound assembly 61 of paper sheets containing printed material to be bound in the hard cover product as a book. The bound assembly 61 attaches to the spine 22.

Figure 6:
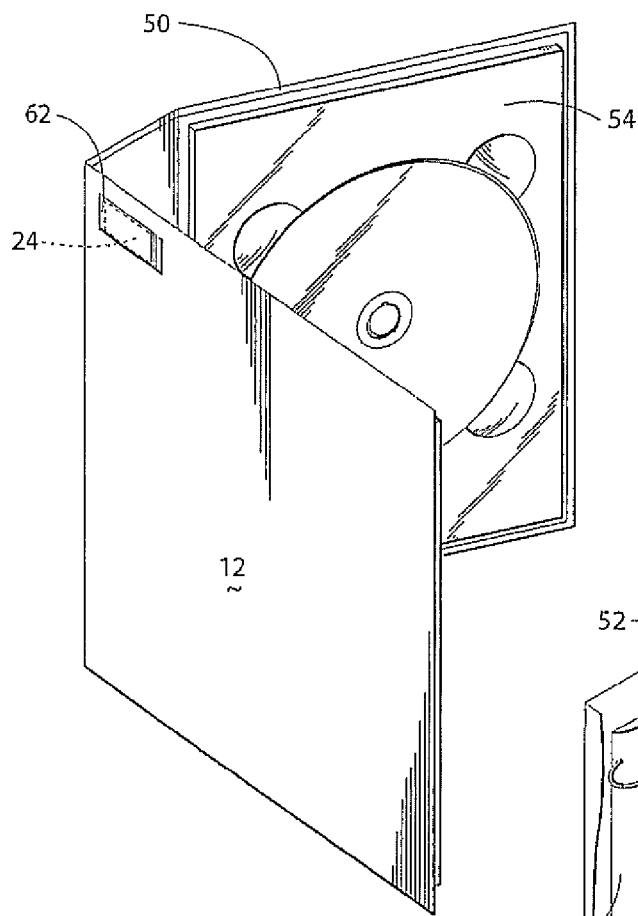
FIG. 6 is a perspective view of a hard cover product illustrating features of the present invention.

FIG. 6 illustrates the hard cover product 50 in which the outer liner 12 includes an indicia 62 such as a bar code or other product inventory number. In this embodiment, the recess 32 for the security tag 24 (or security tag 52 attached to the sheet 14) is disposed substantially in alignment with the indicia 62. In this way, a security tag detector deactivates the security tag when the hard cover product 30 is scanned for pricing, so that the product can be taken from a store without triggering alarms.

Figure 7:
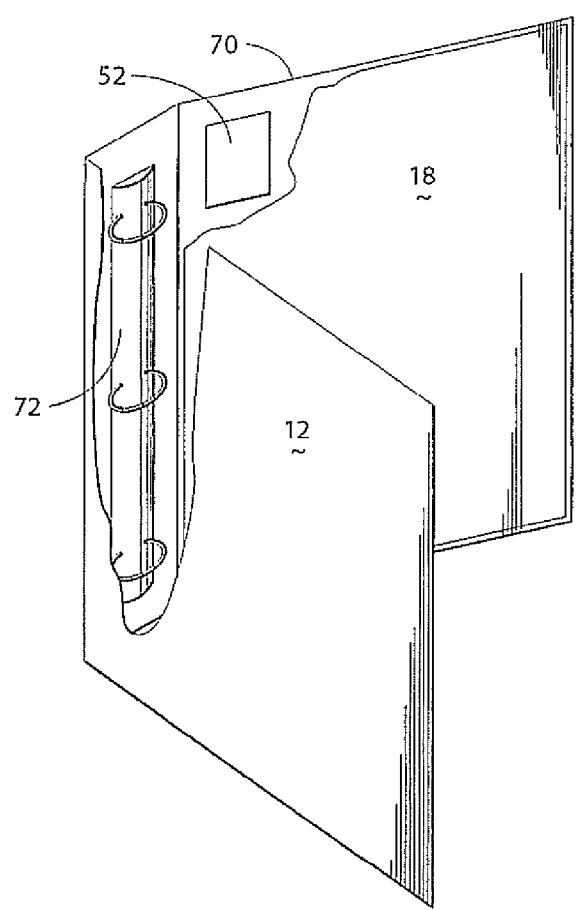
FIG. 7 is a perspective view of an alternate embodiment of the hard cover product according to the present invention.

FIG. 7 illustrates an alternate embodiment of a hard cover product 70 that includes a three-ring binder assembly 72. In this embodiment, the sheet 14 receives one of the sheet-like security devices 52, although in an alternate embodiment, the sheet defining front (or back) cover includes the recess 32.

FIG. 9 is a schematic illustration of an assembly line 90 for manufacturing hard cover products of the present invention discussed above. The assembly line 90 includes a supply hopper 92 that receives a stack 93 of interim assemblies of the hard cover product. A casing machine 94 operates to cut blanks of cardboard sheets to define the front and back cover bodies enclosed in the outer and inner liners. The casing machine 94 also includes a rotatatable cylinder 91 with a cutter 95 for slitting open the recess 32. An interim assembly of the hard cover product includes the outer liner 12 attached to the sheets 14, 16. A label applicator 96 receives a supply of security tags 24 and positions one in the recess 32 or on the sheet 14 (for a sheet type security tag). Operation of the assembly line in a first stage of manufacture results in interim assemblies that are subsequently returned to the hopper for attaching the inner liner 18.

The assembly line 90 further includes an inner liner application station 97 in which the inner liner 18 is attached in overlying relation to the major surfaces of the sheets 14, 16 opposing the outer liner 12. A glue station 98 includes an adhesive applicator 100 for depositing a selected adhesive 101 to the inner liner 18. A casing applicator 102 includes a supply hopper 104 that holds a plurality of interior bodies or casings 103, such as the engageable shells 54, 56. A metering device 106 causes one of the casings 103 to be positioned on the spine 22. Opposing ploughs 108 guide the opposing front and back covers to pivot together to foldingly close the hard cover product. Rollers 110 bear against the opposing covers to close the hard cover product and to force the casing 103 into engaging contact with the adhesive. The completed, closed hard cover product then is received in a stacker 112 for packaging.

Figure 10:
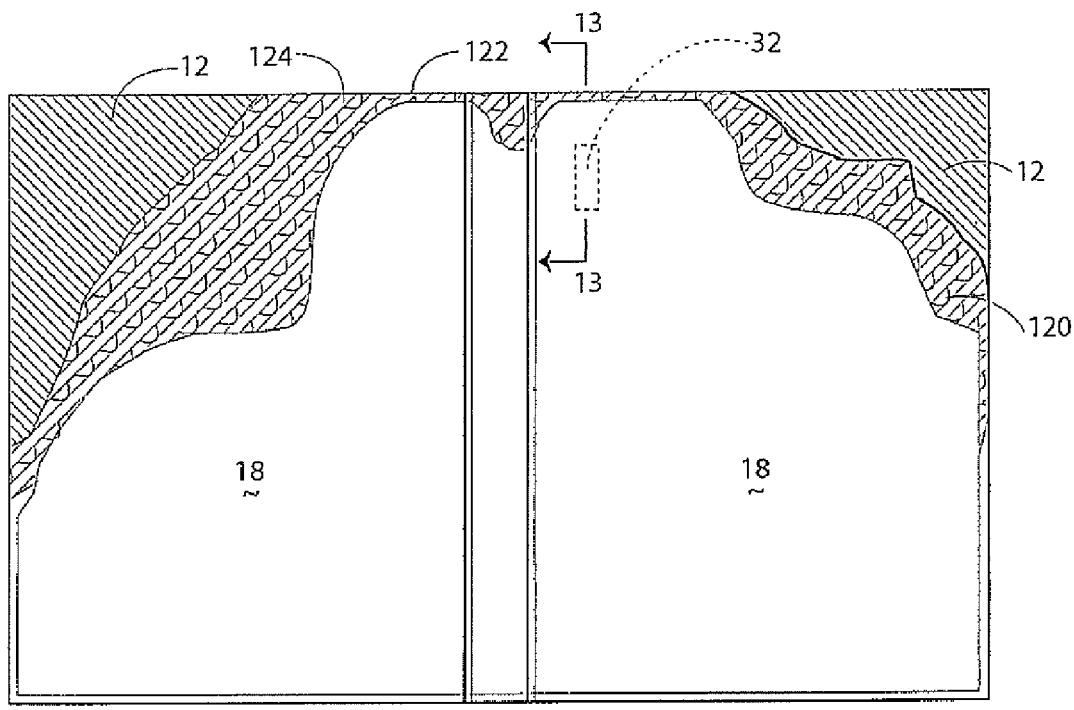
FIG. 10 is a plan view of a hard cover product in which a security device is enclosed in an intermediate laminated cover board according to the present invention.

While the hard cover product 10 described above provides the enclosed and concealed security sensor 24, the exterior surfaces of the outer liner 12 and the inner line 18 tend to include indications of the presence of the security sensor contained therein. These indications include a subtle but noticeable border defined by the edge of the recess 32, a shallow depression in the outer liner 12 or the inner liner 18 in the proximity of the recess, or a shallowly bulging portion proximate to the recess. The present invention provides in another aspect as illustrated in FIG. 10, an intermediate laminated cover board 120 that does not display surface indications of the presence of the security sensor or device 32 enclosed within a hard cover product 122 assembled using the intermediate laminated cover board. The hard cover product 122 includes the outer liner 12, a cover board 124, the intermediate laminated cover board 120 disposed spaced apart therefrom, and an inner liner 18. The cover board 124 and the intermediate laminated cover board 120 overlaid with the outer liner 12 and the inner liner 18 define front and back covers for the hard cover product, such as a book, a binder, a disc enclosure, or the like product having an interior body. A gap between the spaced apart cover board 124 and intermediate laminated cover board 120 define a spine for the hard cover product 122 that closes by folding the opposing cover boards along line defined by the spine.

Figure 11:
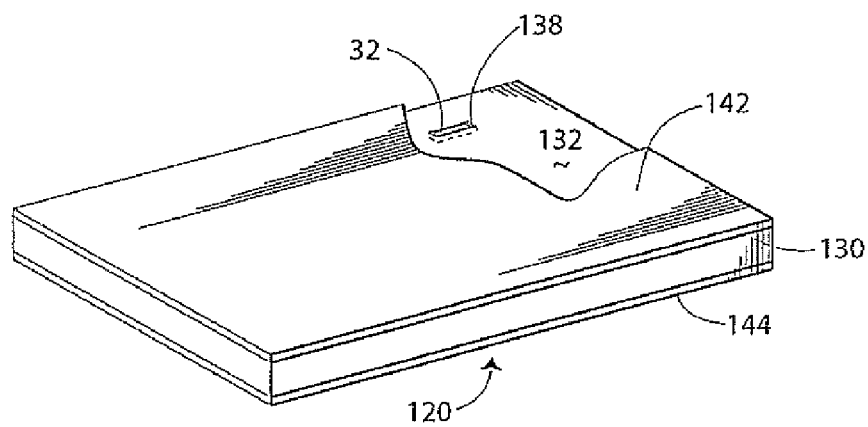
FIG. 11 is a perspective cut-away view of the intermediate laminated cover board illustrated in FIG. 10.
Figure 12:
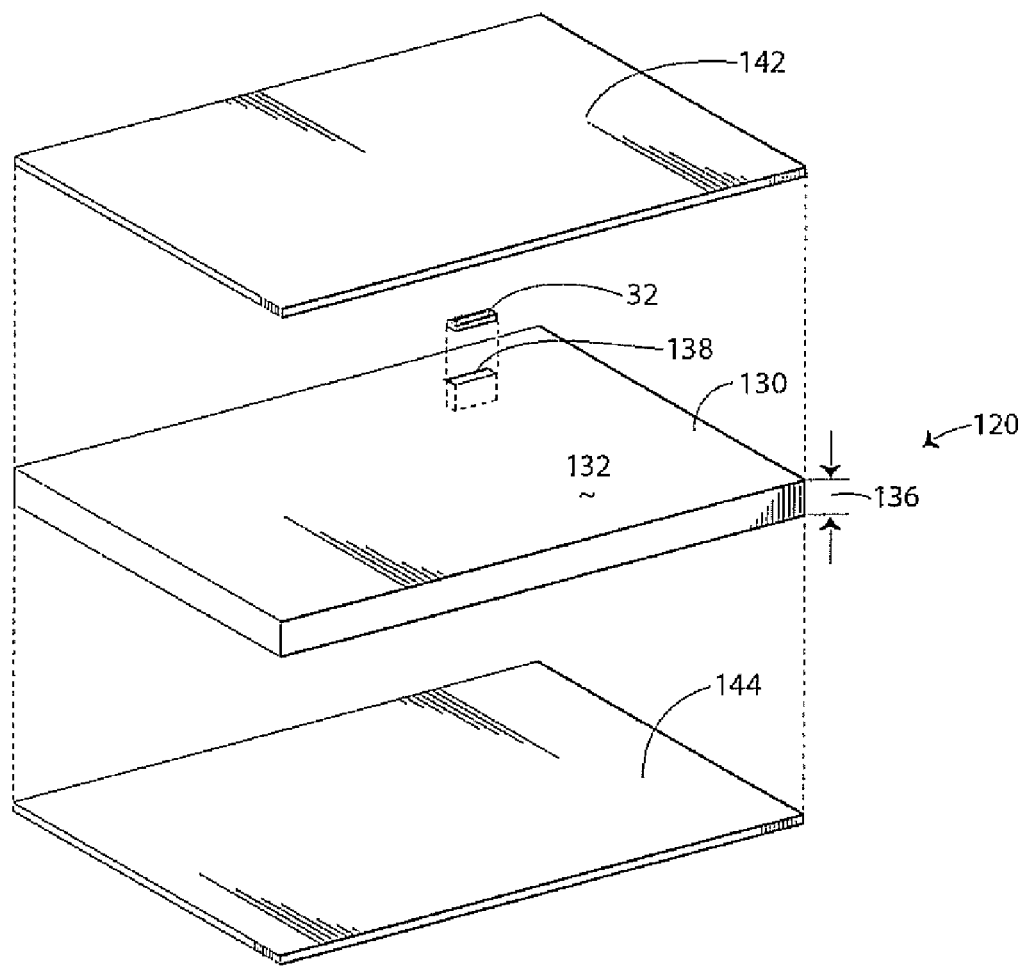
FIG. 12 is a perspective exploded view of the intermediate laminated cover board illustrated in FIG. 10.

With reference to FIGS. 11 and 12, the intermediate laminated cover board 120 (illustrated in perspective cut-away view and perspective exploded view, respectively), is gainfully used for assembling hard cover products 122. The intermediate laminated cover board 120 includes a primary or central sheet 130 having opposing planar surfaces 132, 134 with a length and width exceeding a first thickness 136. The central sheet 130 further defines an opening 138 through the central sheet. The opening 138 is formed by a die cutter such as a roller with an extending die that bears upon the cover board as it moves past the roller on a conveyor. The opening 138 is formed in a selected portion of the cover board, and particularly so that the outer cover 12 can be printed with an indicia such as a bar code that also directs the positioning of a security canceling device such as the scanners used at store checkout registers.

The security device 32 is received in the opening 138. In the illustrated embodiment, the security device 32 has a thickness generally no greater than about a substantial majority of the thickness of the central sheet 130, so that opposing sides of the security device 32 are substantially co-planar with respective ones of the opposing planar surfaces 132, 134 of the central sheet, as best illustrated in cross-sectional view in FIG. 13, taken along line 13-13 of FIG. 10.

A pair of opposing exterior sheets 142, 144 attach with an adhesive as a lamination to respective opposing planar surfaces 132, 134 of the central sheet 130. The exterior sheets 142, 144 each have a respective second thickness that less than the first thickness 136. The laminated exterior sheets 142, 144 thereby enclose the security device 32 in the opening 138 and between the exterior sheets. The thickness of the exterior sheets 142, 144 is sufficiently sized so that the laminated intermediate cover board 120 does not display surface indications of the presence of the security device 32. The security device 32 thereby enclosed in the central sheet 130 is concealed from casual indication of its presence.

The central board 130, as well as the exterior boards 142, 144 are made of a semi-rigid sheet material, such as chip board, pasted chip board, card board, grey fibreboard, or the like material used for cover boards for books, backings for note pads, and the like products.

Figure 13:
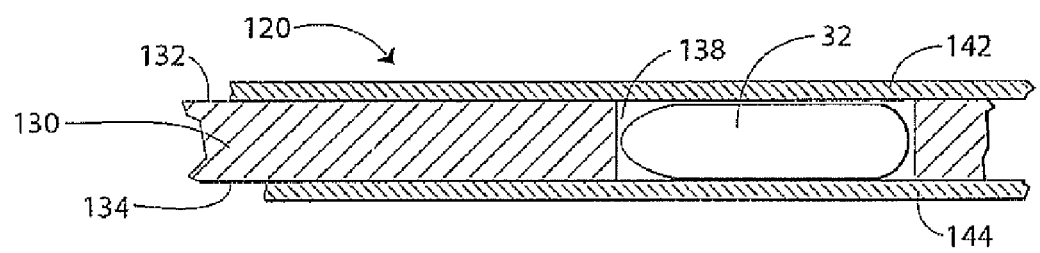
FIG. 13 is a partial cross-sectional view of the intermediate laminated cover board illustrated in FIG. 10, taken along the line 13-13.

With reference to FIGS. 11-13, the center board 130 and the exterior boards 142, 144 intermediate together to produce the laminated board 120 for subsequent use as a component of hard cover products. The central sheet 130 is provided with the opening 138 such as by a die cutter extending through the opposing surfaces in the selected portion. The exterior sheet 144 then laminates with an adhesive to the planar surface 134. This closes the opening 138 on one side. The security device 32 is positioned in the opening 138. As illustrated in FIG. 13, the security device 32 preferably has a thickness no greater than about a substantial majority of the thickness of the central sheet 130 so that opposing sides are no more than substantially co-planar with the opposing planar surfaces 132, 134 of the central sheet. The second exterior sheet 142 laminates to the planar surface 132 to enclose the security device 32 and to form an intermediate laminated board 130 that does not display on the opposing surfaces defined by the exterior sheets indications of the presence of the security device in the intermediate laminated board 130.

In an example, the central board 130 has a length of 7½ inches, a width of 5¾ inches, and a thickness of 0.060 inches. The opening 138 is cut 1 inch from the head of the central board 130 and is centered laterally. A commercially available type of security device has a thickness of about 0.056 inches. The exterior boards 142, 144 conform in length and width to the central board, and have a thickness of about 0.010 inches. In an alternate embodiment, the central board 130 can be left open on one side, by using one exterior board having a thickness of about 0.020 inches, which may be a less expensive embodiment of the invention. Other embodiments are readily apparent to those of ordinary skill in the art of forming hard cover products.

With reference to FIG. 10, the intermediate laminated cover board 130 readily assembles with the cover board 124, the outer cover 12, and the inner cover 18, as discussed above to form the foldable hard cover product 122 to enclose the security device 32 while not having casually observable surface indications as to the security device.

Figure 14:
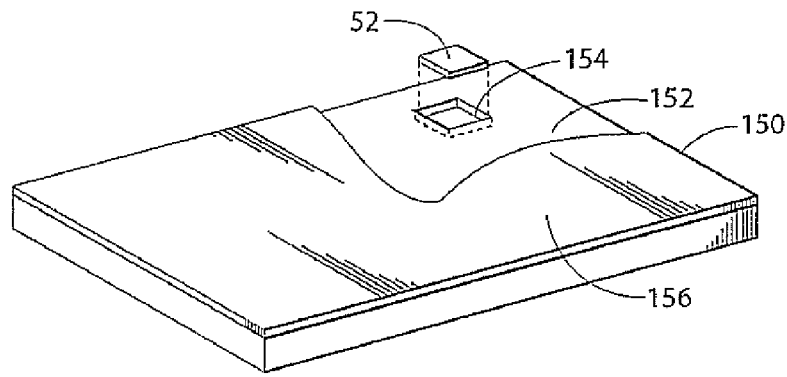
FIG. 14 illustrates in perspective view an alternate embodiment of the intermediate laminated cover board using a sheet type security device in accordance with the present invention.
Figure 15:
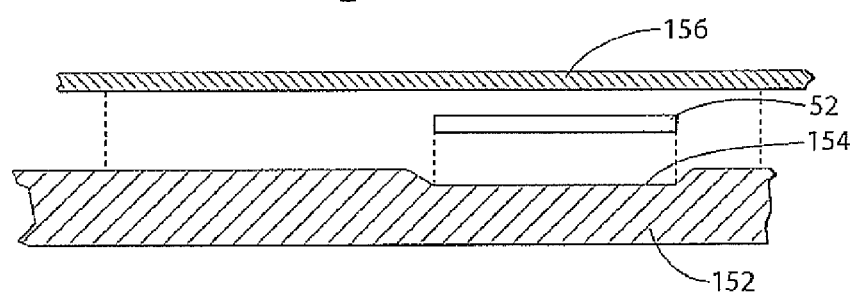
FIG. 15 illustrates in cross-sectional side view the alternate embodiment of the intermediate laminated cover board shown in FIG. 14.

FIG. 14 illustrates in perspective cut-away view an alternate embodiment of a intermediate laminated cover board 150 using a sheet-type security device such as the planar radio frequency tag 52 while not displaying surface indications of the presence the security device. FIG. 15 illustrates in cross-sectional exploded side view the intermediate laminated cover board 150 which defines a shallow recess 154. The recess 154 has a bottom surface and is formed in the cover board by a deboss process. The recess 154 results from passing the cover board 152 between a roller having a projection and a pressure plate, which projection compresses the selected portion of the cover board in order to define the shallow recess 154 therein. The recess 154 thereafter receives one of the planar radio frequency tags 52. The depth of the deboss recess 154 is about the thickness of the radio frequency tag 52, but generally is sufficiently compressed so that an exterior surface of the radio frequency tag 52 is coplanar or recessed relative to a surface of the cover board 152 around the recess. A liner board 156 attaches with adhesive in overlaying relation and enclosing the radio frequency tag 52 in the recess with little if any exterior surface indication of the presence of the security device enclosed within the laminated structure. It is to be appreciated that with respect to FIG. 15, the security sensor (radio frequency tag 52) is totally concealed before a cover 12 and inner liner 18 are applied. The intermediate cover board 150 may also be supplied to a manufacturer of hard cover products (such as a book binder) without the laminated cover liner 156 for application by the binder of the cover 12 and liner 18. This alternate embodiment with the recess 154 may have slight surface indications of the security tag after application of the cover 12.

Figure 16:
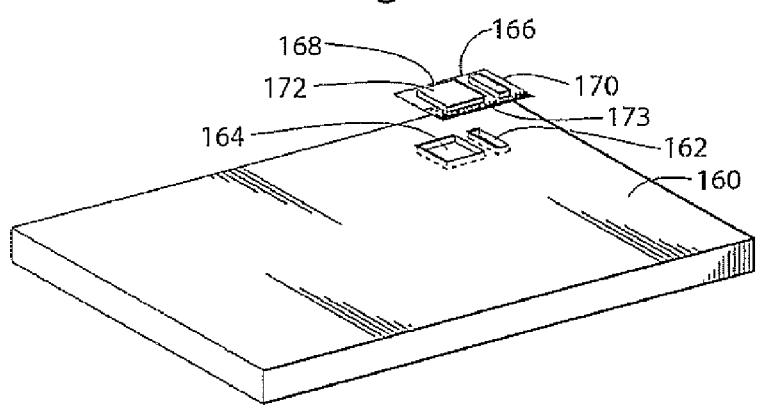
FIG. 16 illustrates in perspective exploded view an alternate embodiment of an intermediate cover board that features a combination dual security device in accordance with the present invention.

FIG. 16 illustrates in perspective exploded view an alternate embodiment of an intermediate cover board 160 that accommodates a combination security device 166. The cover board 160 defines a slot 162 and an adjacent recess 164. The slot 162 is die cut through the cover board 160 while the recess 164 is debossed therein as discussed above. The combination security device 166 includes a backing sheet 168 with an acoustic magnetic security bar 170 and a planar radio frequency tag 172. A perimeter portion of the combination security tag 166 includes an adhesive coating 173.

For purposes of illustration, FIG. 16 illustrates the combination security tag 166 with the security bar 170 and the planar radio frequency tag 172 disposed in a direction away from the cover board 160. When installed, the combination security device 166 is disposed towards the cover board 160 with the security bar 170 received in the slot 162 and planar sheet radio frequency tag 172 disposed in the recess 164, respectively. The adhesive coating 173 on the perimeter secures the combination security tag 166 in place.

While not illustrated, it is to be appreciated with reference to FIGS. 11 and 12 that the combination security tag 166 can be enclosed by laminating a cover liner 142 to the cover board 160, and further in an alternate embodiment, a pair of opposing cover boards 142, 144 can be laminated to opposing sides of the cover board 160. The embodiment illustrated in FIG. 16 is gainfully used in facilities (such as stores or libraries, as examples) having one or both of such security detection devices. The intermediate cover board 160 including the security device 166 is provided to manufacturers of hard cover products for applying cover liners 12 and inner liners 18. The resulting hard cover product has reduced surface indications of the presence of the hidden enclosed security device or with the cover liner 142, 144, the product lacks observable indications of the enclosed security device. The manufacturer of hard cover products can select an embodiment having the cover liners 142, 144, or the single layer intermediate cover board.

Figure 17:
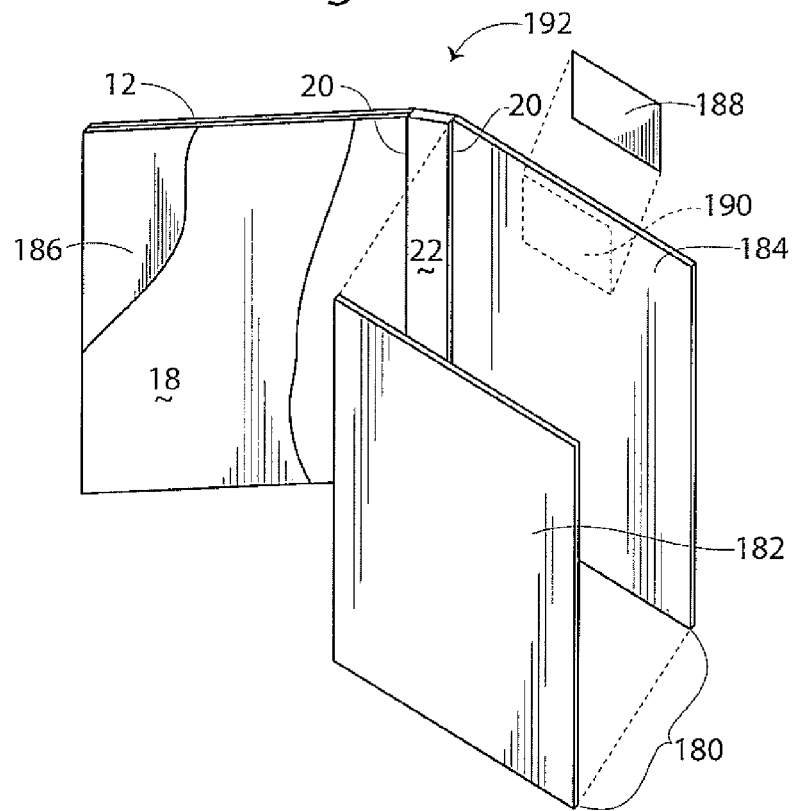
FIG. 17 is a perspective exploded view of an alternate embodiment of a hard cover product in which a thin-film type security device is enclosed within a cover board.

FIG. 17 illustrates in a perspective exploded view a hard cover product 192 having opposing cover boards 180 and 186, in which the cover board 180 conceals a thin-film security device 188. The cover board 186 and the cover board 180 attach to the outer liner 12 and the inner liner 18. The cover boards 186, 180 define front and back covers for the hard cover product 192, such as a book, a binder, a disc enclosure, or the like product having an interior body, as illustrated in FIGS. 6, 7 and 8A. The coverboards are typical caliper board used for book binding or other hardcover products. Generally, the larger the book to be bound or cased, a thicker board is used. For example, a book that has a surface area of approximately 12×12 inches would use a thicker board than a book that has a surface area of 9×6 inches. Larger board warps more readily, so thicker boards are used to reduce warpage. Typically boards are referenced in terms of points or thousands of an inch; for example but not limitation, an 80 point board. The gap 22 between the cover board 186 and the cover board 180 defines the spine for the hard cover product 192. The hard cover product 192 closes by folding the opposing cover boards 180, 186 along the scores 20 in the outer liner 12.

In the illustrated embodiment, the cover board 180 assembles from a pair of opposing boards or sheets 182, 184 that attach together, e.g., with an adhesive, laminatingly on respective opposing major planar surfaces. The boards 182, 184 are typically the same or similar to the above described boards 130, 142, 144, and as such, are typically made of a semi-rigid or flexible material, such as chip board, pasted chip board, card board, grey fibreboard, or the like material used for cover boards for books, backings for note pads, and the like products. The boards 182, 184 attach together to form the cover board 180 for subsequent use as a component of hard cover products, such as for casing in a book binding process. By way of example and without limitation, two 40 point chipboards laminate together to form a substantially 80 point coverboard 180 for use in hard cover products, while concealingly sandwiching there betweenthe security device 188.

The thin-film type security device 188 is typically a thin-film RFID device. Thin-film RFID devices have recently been developed and typically have very thin, planar configurations or sheets, such as RAFSEC tags available from UPM Raflatac at www.upmraflatac.com. Generally, such thin film security device is about 1 to 4 millimeters thick. In accordance with the present invention, such configurations are typically sufficiently thin that the thin-film RFID device 188 can be concealed under a board, sheet, liner, etc., such as the boards 182, 184 (or the liner described below), without the use of a recess, opening, or the like with minimal or no resulting indications of the presence of the thin-film RFID device thereunder. Generally, thin-film security devices have a thickness that is less than a minority portion of the thickness of the coverboard 184 or liner. As discussed above, an RFID device such as the thin-film RFID device 188 includes an electronic response device to include an electronic response device to operate as a security sensor, device, tag, etc. for hard cover products.

The board 184 defines a laydown area or portion 190 on a major planar surface thereof for positioning of the thin-film type security device 188. The laydown area 190 may be merely a designated location for the automated placement of the thin-film type security device 188, or it may also be configured, for example, to facilitate the attachment of the thin-film type security device 82 by adhesive or other means. In some embodiments, the hard cover product 192 may include indicia (not shown) such as a bar code or other product inventory number, for example, indicia 62 on the outer liner 12 with the laydown area 190 substantially in alignment with the indicia. A security device detector for example may read and deactivate the security device (i.e., the thin-film type security device 188) when the hard cover product 192 is scanned for pricing, so that the product can be taken from a store without triggering an alarm. Inventory tracking also may receive information about the sale of the product.

The thin-film type security device 188 is positioned on the laydown area 190, and the boards 182, 184 are laminated or otherwise attached together (e.g., by an adhesive) sandwiching the thin-film type security device 188 there betweenand thereby substantially or totally concealing its presence inside the coverboard 184. The opposing sides of the board 180 are substantially parallel without a surface indication of the security device 188 concealed within the board.

Figure 18:
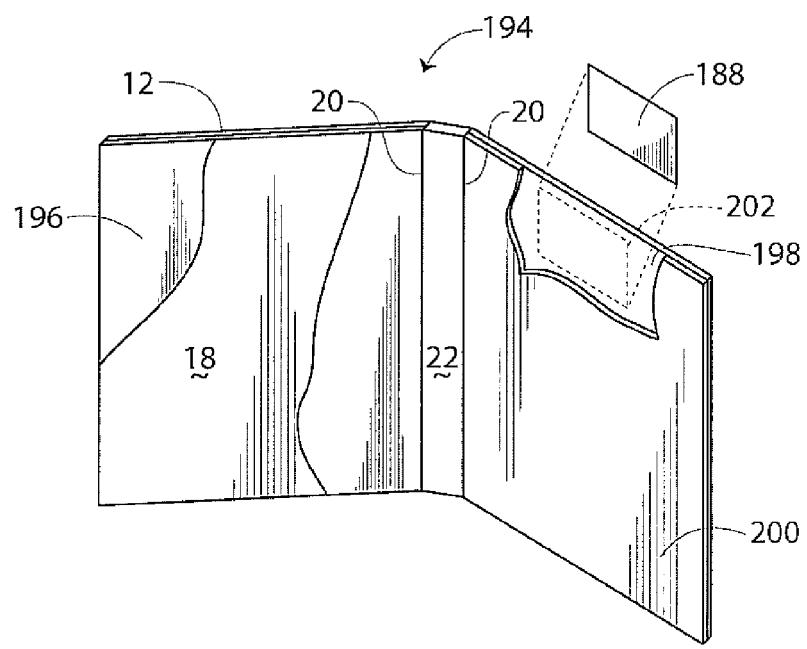
FIG. 18 is a perspective cut-away view of an alternate embodiment of a hard cover product in which a thin-film type security device is concealed between a cover board and a liner.

FIG. 18 illustrates in a perspective cut-away view a hard cover product 194 which conceals the thin-film type security device 188 attached to a planar surface of the cover board 198. The cover boards 196, 198 with the outer liner 12 and the inner liner 200, define front and back covers for the hard cover product 194, such as a book, a binder, a disc enclosure, or the like product having an interior body as shown in FIGS. 6, 7, and 8A. The gap 22 between the cover boards 196, 198 defines a spine for the hard cover product 194 that closes by folding the opposing cover boards along the lines defined by the spine 22.

The cover boards 196, 198 each include an inner liner 200 that attaches in overlaying relation, e.g., with an adhesive, to respective opposing surfaces of the boards 196, 198. The liner 200 is the same or similar to the above described inner liner 18 typically made of an appropriate laminate material such as one of the flexible materials described above. The cover boards 196, 198 and liner 202 laminate together to produce hard cover product 194.

In the illustrated embodiment, the board 198 defines a laydown area 202 on a major planar surface thereof for the placement of the thin-film type security device 188. The thin-film security device 188 is positioned on the laydown area 200 such as with adhesive. The security device 188 may include an adhesive layer, or the adhesive can be applied through a nozzle to the laydown area. The liner 200 is laminated to the board 198 or otherwise attached thereto (e.g., by an adhesive) to overlie and concealingly enclose the thin-film type security device 188 between the liner 200 and the coverboard 198 and thereby substantially or totally conceal its presence. In an alternate embodiment, similarly, the laydown area 202 may be on a surface of the coverboard 198 covered by the outer liner 12.

Cover liners and inner liners typically have a range of about 80 pound uncoated to about 110 pounds cover weight, although that can vary. It is to be appreciated that the liner 200 generally is thinner or more flexible than the board, and in this embodiment, there may be a slight raised portion at the location of the laydown area with the thin film security device 188, but such presence is not readily detectible by casual observation unless the observation is made more carefully, yet the hard cover product is within the scope of the invention.

Figure 19:
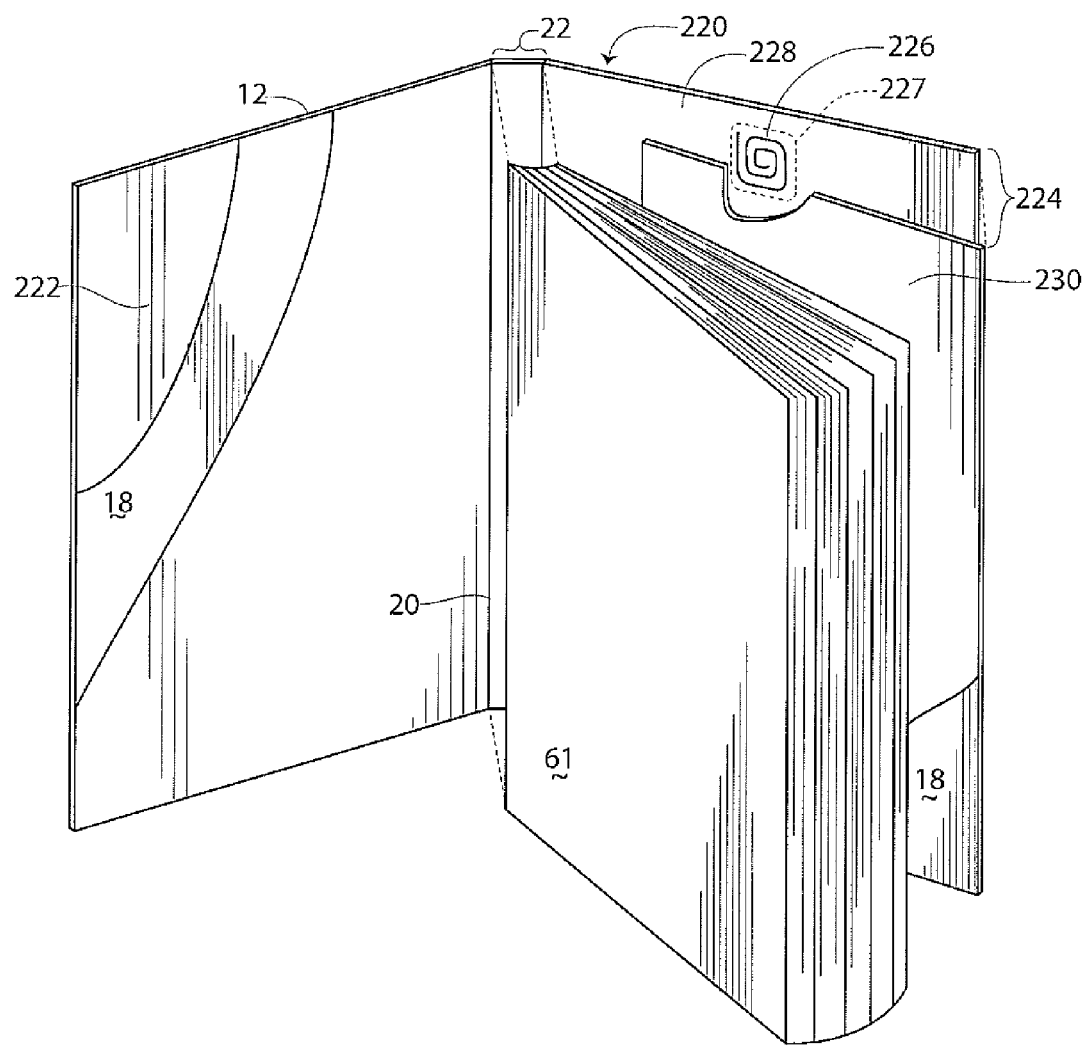
FIG. 19 illustrates in perspective cut-away view an alternate embodiment of a hard cover product with a thin-film ink-circuit security device printed in situ and concealed between opposing sheets that define a cover board.

The illustrative embodiments of the hard cover products discussed above concealingly receive and enclose security devices that are responsive to radio frequency interrogators, and it is to be appreciated that security devices assembled in situ such as by direct printing of circuit and antenna for the security device using thin layers of electrically conductive ink are gainfully used with the hard cover product disclosed herein. In that regard, FIG. 19 illustrates in a cut-away perspective exploded view a hard cover product 220 having opposing cover boards 222, 224, in which the cover board 224 conceals a thin-film ink-circuit printed security device 226 printed in situ on a laydown area 227 (designated with dashed line). The cover board 222, 224 attach to the outer liner 12 and the inner liner 18 in spaced-apart relation to define the gap 22. The cover boards 222, 224 define front and back covers for the hard cover product 220, such as a book, a binder, a disc enclosure, or the like product having an interior body, as illustrated in FIGS. 6, 7 and 8A. As noted above, the coverboards are typical caliper board used for book binding or other hardcover products; for example, an 80 point board. The gap 22 defines the spine for the hard cover product 192. In one embodiment, the gap 22 receives an elongate strip, for example, KRAFT paper or chipboard binder material, for strengthened back or spine portion. The hard cover product 220 closes by folding the opposing cover boards 222, 224 along lines defined on opposing sides of the gap 22; for example, along scores in the outer liner 12.

In the illustrated embodiment, the cover board 224 assembles from a pair of opposing boards or sheets 228, 230 that attach together, e.g., with an adhesive, laminatingly on respective opposing major planar surfaces. The boards 228, 230 are typically the same or similar to the above described boards 130, 142, 144, 180, 186 and as such, are typically made of a semi-rigid or flexible material, such as chip board, pasted chip board, card board, grey fibreboard, or the like material used for cover boards for books, backings for note pads, and the like products. The boards 228, 230 attach together to form the cover board 224 for subsequent use as a component of hard cover products, such as for casing in a book binding process. By way of example and without limitation, two 40 point chipboards laminate together to form a substantially 80 point coverboard for use in hard cover products, while concealingly sandwiching there betweenthe ink-circuit printed security device 226.

The thin-film ink-circuit security device 226 is an RFID circuit printed directly on the surface of the board 228 in the laydown area 227. The laydown area 227 can be a planar surface. With reference to FIG. 9 discussed above, the label applicator 96 is not used for manufacture of this embodiment. Rather, the label applicator 96 is replaced with a printer device configured for applying electrically conductive ink of a type known in the electronics circuit art for printing and encoding an RFID circuit with antenna for responding to radio frequency interrogation. In an alternate embodiment, however, the printed circuit 226 is configured for active response with a processor or chip and memory device and a battery for operating the active RFID. In this embodiment, the label applicator 96 is configured for placement of the chip and the battery in electrical communication with the printed circuit. The ink-printed circuit 226 is a thin film such as less than 1 to about 4 millimeters thick. Generally, thin-film ink-printed security devices have a thickness that is less than a minority portion of the thickness of the coverboard 228. In accordance with the present invention, such printed ink circuit is sufficiently thin that the RFID-configured ink-circuit printed security device 226 can be concealed sandwiched between opposing boards, sheets, or liner, such as the boards 228, 230 (or the liner described below), without the use of a recess or debossment, with minimal or no resulting indications of the presence of the thin-film ink-printed secutity device thereunder.

The board 228 defines the laydown area or portion 227 on a major planar surface thereof for printing of the thin-film type security device 226. The laydown area 227 may be merely a designated location for the automated printing of the ink-printed security device 226, or it may also be configured with a recess or debossment, for example, to facilitate the attachment of the chip and battery portion of the printed-ink circuit by adhesive or other means. In some embodiments, the hard cover product 220 may include indicia (not shown) such as a bar code or other product inventory number, for example as discussed above, indicia 62 on the outer liner 12, with the laydown area 227 substantially in alignment with the indicia. A security device detector, for example, may read and deactivate the security device 226 when the hard cover product is scanned for pricing, so that the product can be taken from a store without triggering an alarm or with an active security device to program, enter date, or update the security device as is conventional in the trade.

The thin-film ink-circuit security device 226 is printed in situ on the laydown area 227, and the boards 228, 230 are laminated or otherwise attached together (e.g., by an adhesive) sandwiching the printed thin-film security device 226 there betweenand thereby substantially or totally concealing its presence inside the coverboard 224. The opposing sides of the board 224 are substantially parallel without a surface indication of the security device 226 concealed within the board. An interior body, such as the illustrated bound pages 61 defining a book attach conventionally within the hard cover product 220, such as to the coverboards 222, 224 and liner sheet 18.

Figure 20A:
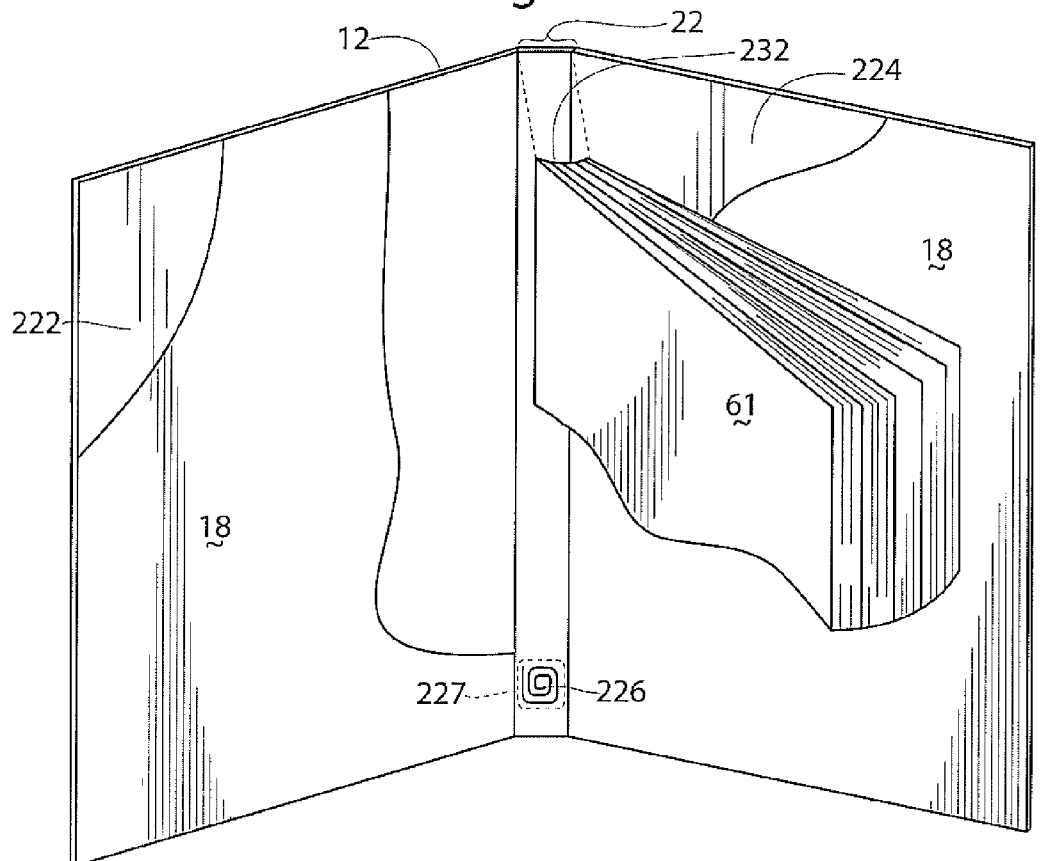
FIG. 20a illustrates in perspective cut-away view an alternate embodiment of a hard cover product with a thin-film ink-circuit security device printed in situ on a surface of the spine and concealed by an inner body.

FIG. 20a illustrates an alternate embodiment in which the spine 22 defines the laydown area 227. In this embodiment, a back 232 of the bound pages 61 covers and conceals the ink-circuit security device 226 printed on the spine. The printed security device 226 in the embodiment may be on the inner surface of the outer liner 12 or printed on a KRAFT or chipboard sheet (not illustrated) received into the spine gap.

Figure 20B:
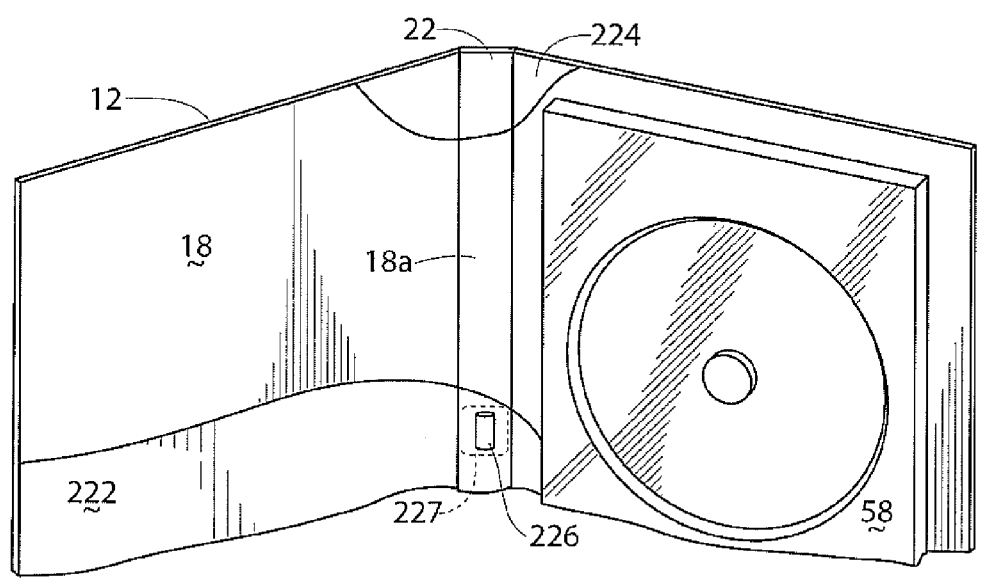
FIG. 20b illustrates in perspective cut-away view an alternate embodiment of a hard cover product with a thin-film ink-circuit security device printed in situ on a surface of the spine and concealed by an inner liner sheet.

FIG. 20b illustrates an alternate embodiment in which the spine 22 defines the laydown area 227. In this embodiment, the liner 18 includes a covering portion 18a that overlaps the gap 22. The liner 18 laminates to the cover boards 222, 224 and with the covering portion 18a conceal the ink-circuit security device 226 from casual indication of its presence and held after attachment safely and securely therein during manufacture of the hard cover product and during normal use thereof for hard cover product purposes.

Figure 21:
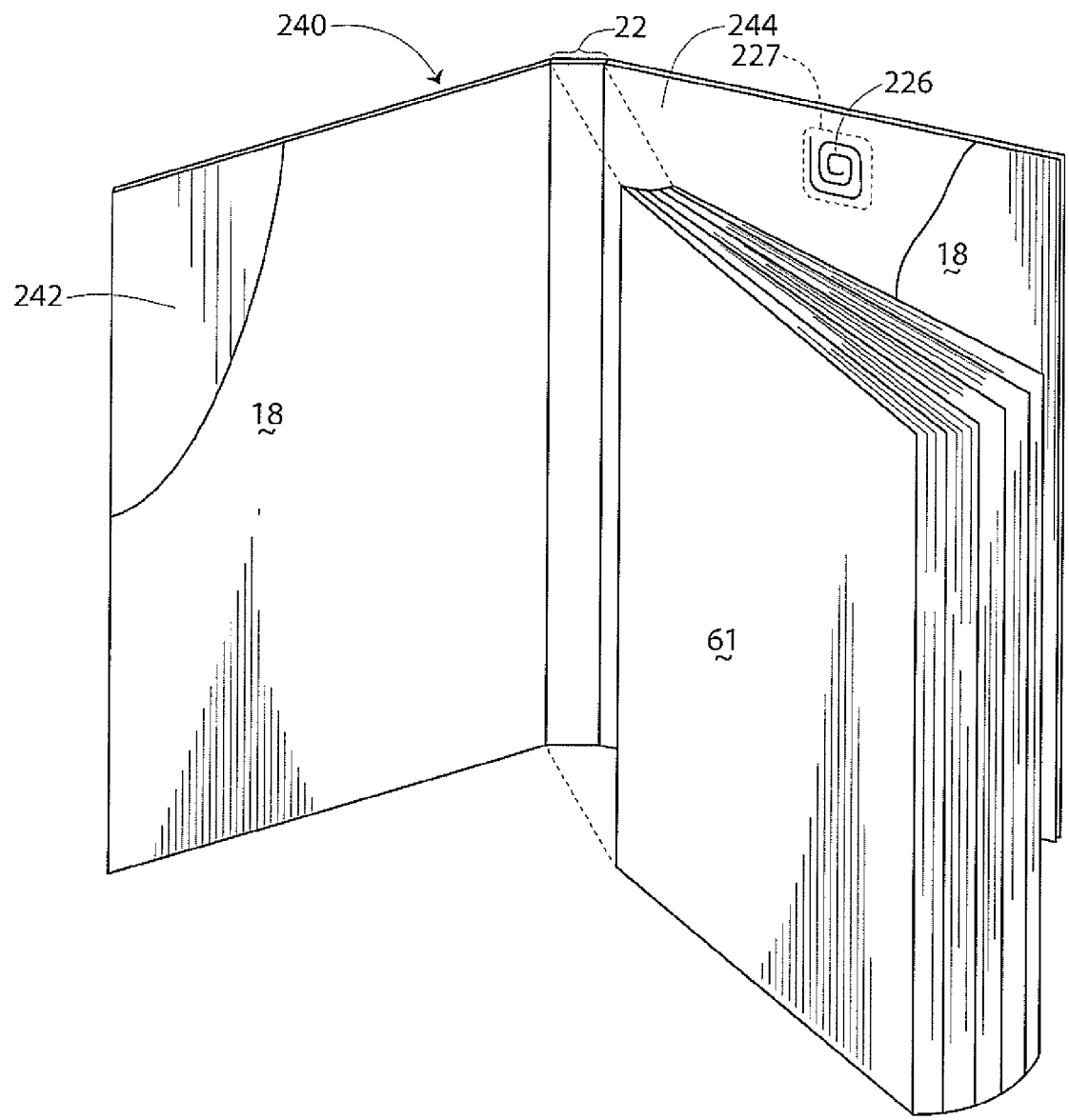
FIG. 21 illustrates in perspective cut-away view an alternate embodiment of a hard cover product with a thin-film ink-circuit security device printed in situ on a surface of a cover board and concealed by the inner liner.

FIG. 21 illustrates in a perspective cut-away view a hard cover product 240 having a pair of cover boards 242, 244 attached in spaced-apart relation to the outer liner 12. The cover boards 242, 244 are the same or similar to the above described boards 130, 142, 144, 180, 186, and 222 and are made of a semi-rigid or flexible material, such as chip board, pasted chip board, card board, grey fibreboard, or the like material used for cover boards for books, backings for note pads, and the like products. In this embodiment, the cover board 244 defines the laydown area 227 on which the thin-film ink-circuit security device 226 is printed in situ. The inner liner 18 adhesively overlies the interior surface of the coverboard 244. The cover boards 242, 244 with the outer liner 12 and the inner liner 18, define front and back covers for the hard cover product 240, such as a book, a binder, a disc enclosure, or the like product having an interior body as shown in FIGS. 6, 7, and 8A. The gap 22 between the cover boards 242, 244 defines a spine for the hard cover product 240 that closes by folding the opposing cover boards along the lines defined by the spine 22.

The liner 18 laminated to the board 244 overlies and concealingly encloses the thin-film ink-circuit security device 226 between the liner 18 and the coverboard 244 and thereby substantially or totally conceals its presence. In an alternate embodiment, similarly, the laydown area 227 may be on a surface of the coverboard 244 covered by the outer liner 12.

This specification has described the present invention that provides a hard cover product with concealed security devices, including the steps necessary for making and using various embodiments thereof. It is to be understood, however, that numerous changes and variations may be made in the construction of the present hard cover product within the spirit and scope of the present invention, and that modifications and changes may be made therein without departing from the scope thereof as set forth in the appended claims.

What is claimed is:

1. A hard cover product, comprising:
   an outer liner;
   a pair of rigid cover boards pre-cut to a selected size and disposed in spaced-apart relation on the outer liner to define a spine for a hard cover product while defining opposing front cover and back cover therefor and each attached on a respective major surface to a major surface of the outer liner;
   at least one of the rigid cover boards comprising:
      a pair of opposing sheets having opposing planar surfaces with a length and width exceeding a thickness, a first one of the pair of opposing sheets defining in a selected portion a laydown area on the planar surface thereof;
      a thin-film ink-circuit security device printed on the laydown area, the printed thin-film ink-circuit security device having a thickness no greater than about a minority of the thickness of the sheet; and
      the pair of opposing sheets laminated together to sandwich the thin-film printed thin-film ink-circuit security device concealingly there between, with the opposing sides of the one of the rigid cover boards substantially parallel without a surface indication of the presence of the printed thin-film ink-circuit security device therein, whereby the printed thin-film ink-circuit security device enclosed and laminated in said one of the rigid cover boards is concealed from casual indication of its presence and is held after lamination safely and securely therein during normal use thereof for hard cover product purposes; and
   an interior body cooperatively supported within the hard cover product,
   whereby the opposing rigid cover boards define a front cover and back cover that move together foldably along lines defined by opposing sides of the spine for containing the interior body within the hard cover product.

2. The hard cover product as recited in claim 1, further comprising a pair of inner liners, each attached in overlying relation to a respective one of the opposing planar surfaces of the rigid cover boards.

3. A hard cover product, comprising:
   an outer liner;
   a pair of cover boards pre-cut to a selected size and disposed in spaced-apart relation on the outer liner to define a spine for a hard cover product while defining opposing front cover and back cover therefor and each attached on a first respective major surface to a major surface of the outer liner;
   at least one of the cover boards comprising a sheet having opposing planar surfaces with a length and width exceeding a thickness, a first one of the opposing planar surfaces defining in a selected portion a laydown area thereof; and
   a thin-film ink-circuit security device printed on the laydown area, the printed thin-film ink-circuit security device having a thickness no greater than about a minority of the thickness of the sheet;
   an inner liner attached in overlying relation to the respective second major surface of the one of the cover boards, the inner liner and the one of the cover boards laminated together to sandwich the printed thin-film ink-circuit security device concealingly there between, whereby the printed thin-film ink-circuit security device enclosed therein is concealed from casual indication of its presence and is held after lamination safely and securely therein during normal use thereof for hard cover product purposes; and
   an interior body cooperatively supported within the hard cover product,
   whereby the opposing cover boards define a front cover and back cover that move together foldably along lines defined by opposing sides of the spine for supporting and enclosing the interior body within the hard cover product.

4. A hard cover product, comprising:
   an outer liner;
   a pair of cover boards pre-cut to a selected size and disposed in spaced-apart relation on the outer liner to define a gap as a spine for a hard cover product while defining opposing front cover and back cover therefor and each attached on a respective first major surface to a major surface of the outer liner;
   the cover boards each comprising a sheet having opposing planar surfaces with a length and width exceeding a thickness;
   the spine defining in a selected portion a laydown area;
   a thin-film ink-circuit security device printed on the laydown area, the security device having a thickness no greater than about a minority of the thickness of the cover boards; and
   an inner liner attached in overlying relation to a second major surface of at least one of the cover boards, the inner liner and the respective cover board laminated together; and an interior body cooperatively supported within the hard cover product with a back attached to the spine for concealing the printed thin-film ink-circuit security device from casual indication of its presence and is held after attachment safely and securely therein during normal use thereof for hard cover product purposes, whereby the opposing cover boards define a front cover and back cover that move together foldably along lines defined by opposing sides of the spine for supporting and enclosing the interior body within the hard cover product.

5. A hard cover product, comprising:

an outer liner;

a pair of cover boards pre-cut to a selected size and disposed in spaced-apart relation on the outer liner to define a gap as a spine for a hard cover product while defining opposing front cover and back cover therefor and each attached on a respective first major surface to a major surface of the outer liner;

the cover boards each comprising a sheet having opposing planar surfaces with a length and width exceeding a thickness;

the spine defining in a selected portion a laydown area;

a thin-film ink-circuit security device printed on the laydown area, the security device having a thickness no greater than about a minority of the thickness of the cover boards; and an interior body cooperatively supported within the hard cover product and having a back attached to the spine for concealing the printed thin-film ink-circuit security device from casual indication of its presence and the security device is held after attachment safely and securely therein during normal use thereof for hard cover product purposes, whereby the opposing cover boards define a front cover and back cover that move together foldably along lines defined by opposing sides of the spine for supporting and enclosing the interior body within the hard cover product.

6. The hard cover product as recited in any of claims 1, 3, 4, or 5, wherein the outer liner defines a coded indicia that is displayed on a portion thereof in alignment with the laydown area.

7. The hard cover product as recited in any of claims 1, 3, 4, or 5, wherein the printed thin-film ink-circuit security device includes a printed electrically conductive ink that defines a radio frequency circuit and antenna configured for responding to radio frequency signals.

8. The hard cover product as recited in any of claims 1, 3, 4, or 5, wherein the printed thin-film ink-circuit security device further comprises an electronic processor with memory programmable with a unique identification code for use in responding to radio frequency signals.

9. The hard cover product as recited in any of claims 1, 3, 4, or 5, wherein the interior body is configured to receive a compact disc.

10. The hard cover product as recited in any of claims 1, 3, 4, or 5, wherein the interior body comprises a plurality of pages bonded together along a side edge to define a book.

11. The hard cover product as recited in any of claims 1, 3, 4, or 5, wherein the interior body comprises a ring member for receiving sheets.

12. The hard cover product as recited in any of claims 1, 3, 4, or 5, wherein the printed thin-film ink-circuit security device is an RFID device.

13. The hard cover product as recited in any of claims 1, 3, 4, or 5, wherein the rigid cover boards are chipboard.

14. The hard cover product as recited in any of claims 1, 3, 4, or 5, wherein the rigid cover boards are cardboard.

15. The hard cover product as recited in any of claims 1, 3, 4, or 5, wherein the rigid cover boards are fibreboard.

16. The hard cover product as recited in any of claims 1, 3, 4, or 5, wherein the laydown area comprises a recess.

17. The hard cover product as recited in any of claims 1, 3, 4, or 5, wherein the laydown area comprises a debossment.

18. The hard cover product as recited in any of claims 1, 3, 4, or 5, wherein the laydown area comprises a planar surface.

19. The hard cover product as recited in claim 5, further comprising a pair of inner liners, each inner liner attached in overlying relation to a second major surface of a respective one of the cover boards, the inner liner and the respective one of the cover boards laminated together.

20. A method of making a hard cover product with a concealed security device, comprising the steps of:

(a) printing a thin-film ink-circuit security device on a laydown area of a first one of a pair of opposing sheets each sheet having opposing planar surfaces with a length and width exceeding a thickness thereof, the pair of opposing sheets pre-cut to a pre-determined size, the pair of opposing sheets laminated together to define a first of a pair of rigid cover boards and to thereby sandwich the thin-film printed thin-film ink-circuit security device concealingly in the first of the pair of cover boards, with the opposing sides of the first of the rigid cover boards substantially parallel without a surface indication of the presence of the printed thin-film ink-circuit security device therein, whereby the printed thin-film ink-circuit security device enclosed and laminated in said first of the rigid cover boards is concealed from casual indication of its presence and is held after lamination safely and securely therein during normal use thereof for hard cover product purposes;

(b) attaching to an outer liner the pair of rigid cover boards disposed in spaced-apart relation to define a spine gap for a hard cover product while defining opposing front cover and back cover therefor and each attached on a respective major surface to a major surface of the outer liner;

and (c) attaching an interior body cooperatively supported within the hard cover product, whereby the opposing rigid cover boards define a front cover and back cover that move together foldably along lines defined by opposing sides of the spine for containing the interior body within the hard cover product.

21. A method of making a hard cover product with a concealed security device, comprising the steps of:

(a) printing a thin-film ink-circuit security device on laydown area of a first cover board, the printed thin-film ink-circuit security device having a thickness no greater than about a minority of a thickness of the cover board;

(b) attaching the first cover board and a second cover board to an outer liner, the first and second cover boards pre-cut to a selected size and disposed in spaced-apart relation to define a spine for a hard cover product while defining opposing front cover and back cover therefor and each attached on a first respective major surface to a major surface of the outer liner;

(c) attaching an inner liner in overlying relation to a second major surface of the first cover board opposing the outer liner, the inner liner and the first cover board laminated together to sandwich the printed thin-film ink-circuit security device concealingly there between, whereby the printed thin-film ink-circuit security device enclosed therein is concealed from casual indication of its presence and is held after lamination safely and securely therein during normal use thereof for hard cover product purposes;

(d) attaching an interior body cooperatively supported within the hard cover product, whereby the opposing cover boards define a front cover and back cover that move together foldably along lines defined by opposing sides of the spine for supporting and enclosing the interior body within the hard cover product.

22. A method of making a hard cover product with a concealed security device, comprising the steps of:

(a) attaching to an outer liner a pair of cover boards pre-cut to a selected size and disposed in spaced-apart relation to define a gap that defines a spine for a hard cover product while defining opposing front cover and back cover therefor and each attached on a respective first major surface to a major surface of the outer liner, the cover boards each having opposing planar surfaces with a length and width exceeding a thickness;

(b) printing a thin-film ink-circuit security device on a laydown area in the spine, the printed thin-film ink-circuit security device having a thickness no greater than about a minority of the thickness of the cover boards; and (c) cooperatively supporting an interior body within the hard cover product with opposing sides that define respective inner liners attached to a second major surface of a respective one of the cover boards, and a back attached to the spine for concealing the printed thin-film ink-circuit security device from casual indication of its presence and is held after attachment safely and securely therein during normal use thereof for hard cover product purposes, whereby the opposing cover boards define a front cover and back cover that move together foldably along lines defined by opposing sides of the spine for supporting and enclosing the interior body within the hard cover product.

23. A method of making a hard cover product with a concealed security device, comprising the steps of:

(a) attaching to an outer liner a pair of cover boards pre-cut to a selected size and disposed in spaced-apart relation to define a gap that defines a spine for a hard cover product while defining opposing front cover and back cover therefor and each attached on a respective first major surface to a major surface of the outer liner, the cover boards each having opposing planar surfaces with a length and width exceeding a thickness;

(b) printing a thin-film ink-circuit security device on a laydown area in the spine, the printed thin-film ink-circuit security device having a thickness no greater than about a minority of the thickness of the cover boards;

(c) cooperatively supporting an interior body within the hard cover product, the interior body having a back attached to the spine for concealing the printed thin-film ink-circuit security device from casual indication of its presence and the security device is held after attachment safely and securely therein during normal use thereof for hard cover product purposes, whereby the opposing cover boards define a front cover and back cover that move together foldably along lines defined by opposing sides of the spine for supporting and enclosing the interior body within the hard cover product.

24. The method as recited in any of claim 20, 21, 22 or 23, further comprising the step of providing a coded indicia on a portion of the outer liner in alignment with the laydown area.

25. The method as recited in any of claim 20, 21, 22 or 23, wherein the step of printing further comprises printing with an electrically conductive ink to define a radio frequency response circuit and antenna configured for responding to radio frequency signals.

26. The method as recited in any of claim 20, 21, 22 or 23, further comprising the step of providing to the printed thin-film ink-circuit security device an electronic processor with memory programmable with a unique identification code for use in responding to radio frequency signals.

27. The method as recited in any of claim 20, 21, 22 or 23, wherein the step (d) comprises providing an interior body configured to receive a compact disc.

28. The method as recited in any of claim 20, 21, 22 or 23, wherein the step (d) comprises providing an interior body configured with a plurality of pages bonded together along a side edge to define a book.

29. The method as recited in any of claim 20, 21, 22 or 23, wherein the step (d) comprises providing an interior body configured with a ring member for receiving sheets.

30. The method as recited in claim 20 or 23, further comprising attaching a pair of inner liners, each in overlying relation to an opposing planar surface of a respective one of the rigid cover boards.

\* \* \* \* \*